United States Patent [19]

Vail, III

[11] Patent Number: 4,820,989
[45] Date of Patent: Apr. 11, 1989

[54] METHODS AND APPARATUS FOR MEASUREMENT OF THE RESISTIVITY OF GEOLOGICAL FORMATIONS FROM WITHIN CASED BOREHOLES

[75] Inventor: William B. Vail, III, Bothell, Wash.

[73] Assignee: ParaMagnetic Logging, Inc., Woodinville, Wash.

[21] Appl. No.: 927,115

[22] Filed: Nov. 4, 1986

[51] Int. Cl.⁴ ............................................. G01V 3/02
[52] U.S. Cl. .................................................... 324/368
[58] Field of Search ............... 324/323, 332, 333, 334, 324/347, 354, 357, 358, 360, 363, 364, 366, 368, 370, 373, 375

[56] References Cited

U.S. PATENT DOCUMENTS

| | | | |
|---|---|---|---|
| 1,895,379 | 2/1932 | West | 324/368 |
| 1,934,079 | 11/1933 | Lundberg et al. | 324/358 |
| 1,940,340 | 12/1933 | Zyschlag | 324/358 |
| 1,997,163 | 4/1935 | Zyschlag | 324/358 |
| 2,165,213 | 7/1939 | Blau et al. | 324/368 |
| 2,222,149 | 11/1940 | Lipson | 324/368 |
| 2,224,635 | 12/1940 | Lipson | 324/368 |
| 2,251,900 | 8/1941 | Smith | 324/368 |
| 2,269,269 | 1/1942 | Jessen | 324/368 |
| 2,273,363 | 2/1942 | Lipson | 324/368 |
| 2,297,754 | 10/1942 | Ennis | 324/368 |
| 2,350,832 | 6/1944 | Segesman | 324/368 |
| 2,371,658 | 3/1945 | Stewart | 324/368 |
| 2,397,254 | 3/1946 | Ennis | 324/368 |
| 2,397,255 | 3/1946 | Ennis | 324/368 |
| 2,400,593 | 5/1946 | Neufield | 324/368 |
| 2,414,194 | 1/1947 | Ennis | 324/368 |
| 2,459,196 | 1/1949 | Stewart | 324/368 |
| 2,476,137 | 7/1949 | Doll | 324/368 |
| 2,550,004 | 4/1951 | Doll | 324/368 |
| 2,587,518 | 2/1952 | Pearson | 324/368 |
| 2,613,247 | 10/1952 | Lee | 324/358 X |
| 2,632,795 | 3/1953 | Boucher | 324/368 |
| 2,729,784 | 1/1956 | Fearon | 324/368 |
| 2,891,215 | 6/1959 | Fearon | 324/368 |
| 3,488,574 | 1/1970 | Tanguy | 324/368 |
| 3,548,362 | 12/1970 | Blank | 324/368 |
| 3,568,053 | 3/1971 | Kilpatrick | 324/368 |
| 3,697,864 | 10/1972 | Runge | 324/368 |

OTHER PUBLICATIONS

Dewan, "Essentials of Modern Open-Hole Log Interpretation", *Penn Well Books*, pp. 82-83.

Primary Examiner—Reinhard J. Eisenzopf
Assistant Examiner—Warren S. Edmonds
Attorney, Agent, or Firm—Flehr, Hohbach & Test

[57] ABSTRACT

Methods and apparatus are disclosed which allow measurement of the resistivity of a geological formation through borehole casing which may be surrounded by brine saturated cement. A.C. current is passed from an electrode in electrical contact with the interior of the borehole casing to an electrode on the surface of the earth. The A.C. voltage difference is measured between two additional vertically disposed electrodes on the interior of the casing which provides a measure of the resistivity of the geological formation. A calibration and nulling procedure is presented which minimizes the influence of variations in the thickness of the casing. The procedure also minimizes the influence of inaccurate placements of the additional vertically disposed electrodes.

22 Claims, 3 Drawing Sheets

METHODS AND APPARATUS FOR MEASUREMENT OF THE RESISTIVITY OF GEOLOGICAL FORMATIONS FROM WITHIN CASED BOREHOLES

This invention was made with Government support under DOE Grant No. DE-FG06-84ER13294, entitled "Validating The Paramagnetic Logging Effect," awarded by the Division of Advanced Energy Projects, Office of Basic Energy Sciences, of the U.S. Department of Energy. The Government has certain rights in this invention.

Portions of this application were disclosed in U.S. Disclosure Document No. 154,683 filed on Aug. 14, 1986, which is incorporated herein by reference.

This invention relates to new methods and apparatus which allow the measurement of the resistivity of geological formations adjacent to steel cased drill holes.

Measuring the resistivity of formations adjacent to cased boreholes is important for several reasons. First, such information is useful in locating "missed oil" which is oil in formation which was missed during the original logging operations prior to insertion of the casing. In addition, such information is useful in monitoring water flooding operations during production activities in an oil field.

Numerous U.S. Patents have been issued which address the problem of measuring resistivity through casing. Please refer for example to the following U.S. Pat. Nos. 2,222,149; 2,224,635; 2,273,363; 2,297,754; 2,371,658; 2,414,194; 2,587,518; and 2,891,215. It is well known in the industry that so far there has been no method tried which yields the formation resistivity accurately through casing. The above patents all suffer from various problems which have prevented their successful use in the logging industry. Major problems are devising techniques which yield results that are invariant to contact resistances of the electrodes in contact with the casing and which are immune to thickness variations in the casing.

Accordingly, an object of the invention is to provide new and practical methods of measuring the resistivity of geological formations adjacent to cased boreholes.

It is yet another object of the invention to provide new and practical apparatus for measuring the resistivity of geological formations adjacent to cased boreholes.

Another object of the invention is to provide methods of measuring the resistivity of geological formations adjacent to cased boreholes which are insensitive to the oxidized condition of the borehole casing.

And it is yet another object of the invention to provide apparatus for measuring the resistivity of geological formations adjacent to cased boreholes which are insensitive to the oxidized condition of the borehole casing.

Figure 1:
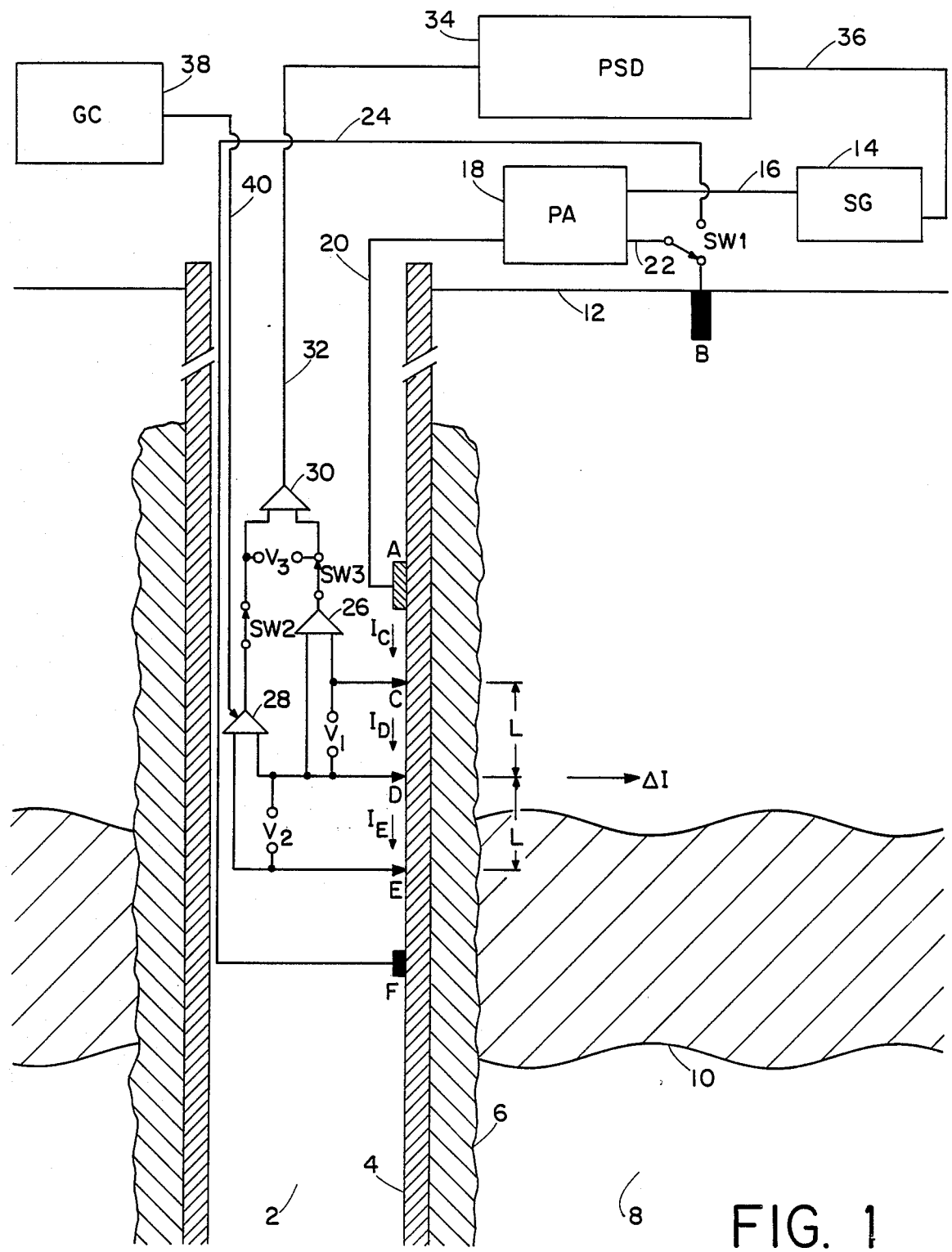
FIG. 1 is a sectional view of one preferred embodiment of the invention of the Thru Casing Resistivity Tool (TCRT).

FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

Electrodes C, D, and E are in electrical contact with the casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop $V_1$ between electrodes C and D which is amplified differentially with amplifier 26. And the voltage difference between electrodes D and E, $V_2$, is also amplified with amplifier 28. With switches SW2 and SW3 in their closed positions as shown, the outputs of amplifiers 26 and 28 respectively are differentially subtracted with amplifier 30. The voltage from amplifier 30 is sent to the surface via cable 32 to a phase sensitive detector 34. The phase sensitive detector obtains it's reference signal from the signal generator via cable 36. In addition, digital gain controller 38 (GC) digitally controls the gain of amplifier 28 using cable 40 to send commands downhole.

In general, with SW1 connected to electrode B, current is conducted through formation. For example, current $\Delta I$ is conducted into formation along the length 2L between electrodes C and E. However, if SW1 is connected to cable 24 and subsequently to electrode F, then no current is conducted through formation to electrode B. In this case, $I_C = I_D = I_E$ since no current $\Delta I$ is conducted into formation.

It should be noted that if SW1 is connected to electrode B then the current will tend to flow through the formation and not along the borehole casing. Calculations show that for 7 inch O.D. casing with a ½ inch wall thickness that if the formation resistivity is 1 ohm-meter, then half of the current will have flowed off the casing and into the formation along a length of 320 meters of the casing. For a formation with resistivity of 10 ohm-meters, this length is 1040 meters instead.

The first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages $V_1$ and $V_2$ are in general different because of thickness variations in the casing, inaccurate placements of the electrodes, and numerous other factors. However, the gain of amplifier 28 is adjusted using the gain controller so that the differential voltage $V_3$ is nulled to zero. (Amplifier 28 may also have phase balancing electronics if necessary to achieve null). Therefore, if the electrodes are left in the same place after balancing for null, spurious effects such as thickness variations in the casing do not affect the subsequent measurements.

With SW1 then connected to electrode B, the signal generator drives the power amplifier which introduces current on the casing thru electrode A which is in contact with the interior of the borehole casing. Sinusoidal current with an amplitude of approximately 10 amps and a frequency set by the signal generator to a frequency nominally between 0.5 Hz and 3 Hz is conducted to the casing here. The low frequency operation is limited by electrochemical effects such as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing, and some current passes through the brine saturated cement surrounding the casing and ultimately through the various resistive zones surrounding the casing. The current is then subsequently returned to the earth's surface through electrode B.

The purpose of this device is to sense a change in the resistivity of the formation adjacent to the borehole and to be able to measure such changes through borehole casing. In many cases, water bearing zones have resistivities of approximately 1 ohm-meter and oil bearing zones have higher resistivities on the order of 10 ohm-meters. The device can measure such a difference through borehole casing and through brine saturated cement surrounding the casing.

The downward flowing current below electrode A gives raise to a voltage drop along the length of the casing. The voltage along the casing is measured at electrodes C, D, and E respectively where the electrodes are separated by equal lengths L. The resistance per unit length of 7 inch O.D. casing with a wall thickness of ½ inch, r, is given by the following:

$$r = 1.4 \times 10^{-5} \text{ ohms/meter} \qquad \text{Eq. 1}$$

The voltage difference generated by a current $I_C$ at electrode C and $I_D$ at electrode D is approximately the average of the two currents times the resistance per unit length, r, times the length L so that:

$$V_1 = (I_C + I_D)rL/2 \qquad \text{Eq. 2}$$

And consequently, $V_2$ is given by the following:

$$V_2 = (I_D + I_E)rL/2 \qquad \text{Eq. 3}$$

The difference between $V_1$ and $V_2$ produced by amplifier 30 with switches SW2 and SW3 closed is given by the following (all amplifiers have unit gain for the purpose of simplicity):

$$V_3 = V_1 - V_2 = (I_C - I_E)rL/2 \qquad \text{Eq. 4}$$

The net 0-to-peak current, $\Delta I$, flowing into the formation along the length of 2L is given by the following:

$$\Delta I = I_C - I_E = (2V_3)/(rL) \qquad \text{Eq. 5}$$

The resistance $R_c$ of a cylindrical electrode of length 2L and of diameter d in contact with a formation of resistivity p is given by the following [Earth Resistances, G. F. Tagg, Pitman Publishing Corporation, N.Y., 1964, Pg 96]:

$$R_c = pLn\,(4L/d)/[4\pi L] \qquad \text{Eq. 6}$$

Therefore, if $R_c$ can be measured, then p can be computed from Eq. 6 as follows:

$$p = 4\pi L\, R_c/Ln(4L/d) \qquad \text{Eq. 7}$$

But the voltage applied to the casing at electrode A is known, and so is the mangitude of $V_o$ (0-peak) which is discussed later in the text. And the current $\Delta I$ flowing into formation from the pipe over the length 2L is also known, so $R_c$ is experimentally given as follows:

$$R_c = V_o/\Delta I \qquad \text{Eq. 8}$$

Consequently, the resistivity of the formation adjacent to the borehole over length 2L is given as follows:

$$p = 4\pi L\, V_o/[\Delta Ln\,(4L/d)] \qquad \text{Eq. 9}$$

The quantity $\Delta I$ is given by Eq. 5, and therefore Eq. 9 becomes the following:

$$p = 2\pi r\, V_o L^2/[V_3 Ln(4L/d)] \qquad \text{Eq. 10}$$

As an additional explanatory note, using just an estimation of the parameter r as given in Eq. 1 for 7 inch O.D. casing with a wall thickness of ½ inch is good enough for some applications of Eq. 10 in that size casing. In addition, it is evident that the average of the parameter r can be directly measured with the invention as follows. With SW1 connected to cable 24 which places the tool into the balancing or calibration state of the tool during which time a known current is passed between electrodes A and F and the output of amplifier 30 is monitored with the PSD 34, and with SW2 open and with SW3 closed, then the resistance of the casing between electrodes C and D is directly measured which is defined as $R_1$ (provided the gains of amplifiers 26 and 30 are calibrated). Similarly, with SW2 closed and with SW3 open, then the resistance of the casing between electrodes D and E is also directly measured which is defined as $R_2$ (provided the gain of amplifier 28 is also calibrated). Therefore, in the approximation used above, the average measured resistance per unit length of the casing (r) defined in Eq. 1 in the invention is given by the following: $r = (R_1 + R_2)/2L$. The parameter r is the last variable needed to calculate the resistivity p in Eq. 10. Or alternatively, with SW2 closed and with SW3 also closed, then $R_2$ in relation to $R_1$ may be precisely measured with the null procedure described in the above text and this information in combination with the resistance of just one section of casing measured between electrodes comprising a pair can be used to calculate the resistivity $\rho$ accurately. Therefore, no matter what detailed step-by-step procedure is used during the calibration procedure, basically measurements of the respective resistances of the casing between the vertically disposed voltage measuring electrodes are obtained which can be used in different mathematical approximations to calculate the current flow into formation and the resistivity of the formation adjacent to the casing.

The experimentally measured parameters are $V_o$, the voltage applied to electrode A and the differential voltage $V_3$ measured with the phase sensitive detector.

Figure 2:
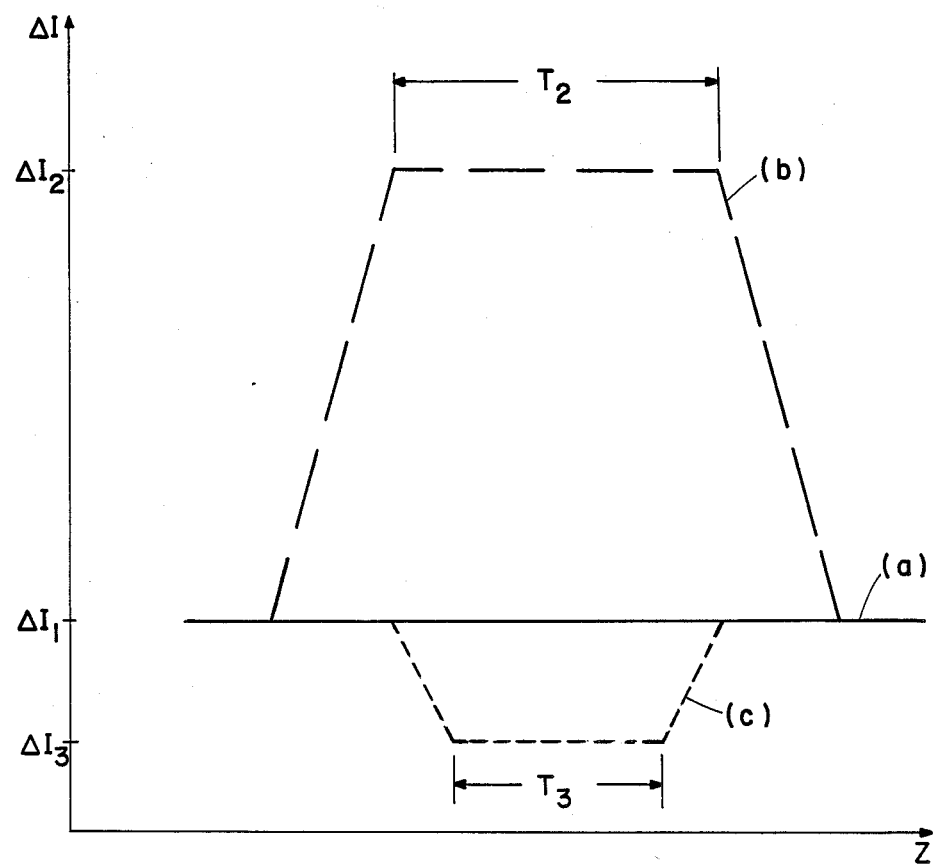
FIG. 2 shows $\Delta I$ vs Z which diagrammatically depicts the response of the tool to different formations.

FIG. 2 shows the current conducted into formation $\Delta I$ for different vertical positions Z within a steel cased borehole. Z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electric field produces outward flowing currents such as $\Delta I$ in FIG. 1 which are inversely proportional to the resistivity of the formation. Therefore, one may expect discontinuous changes in the current $\Delta I$ at the interfaces between various resistive zones. For example, Curve (a) in FIG. 2 shows the results from a uniform formation with resistivity $\rho_1$. Curve (b) shows departures from Curve (a) when a formation of resistivity $\rho_2$ and thickness $T_2$ is intersected where $\rho_2$ is less than $\rho_1$. And Curve (c) shows the opposite situation where a formation is intersected with resistivity $\rho_3$ which is greater than $\rho_1$ and has a thickness of $T_3$. It is obvious that under these circumstances, $\Delta I_3$ is less than $\Delta I_1$, which is less than $\Delta I_2$.

Figure 3:
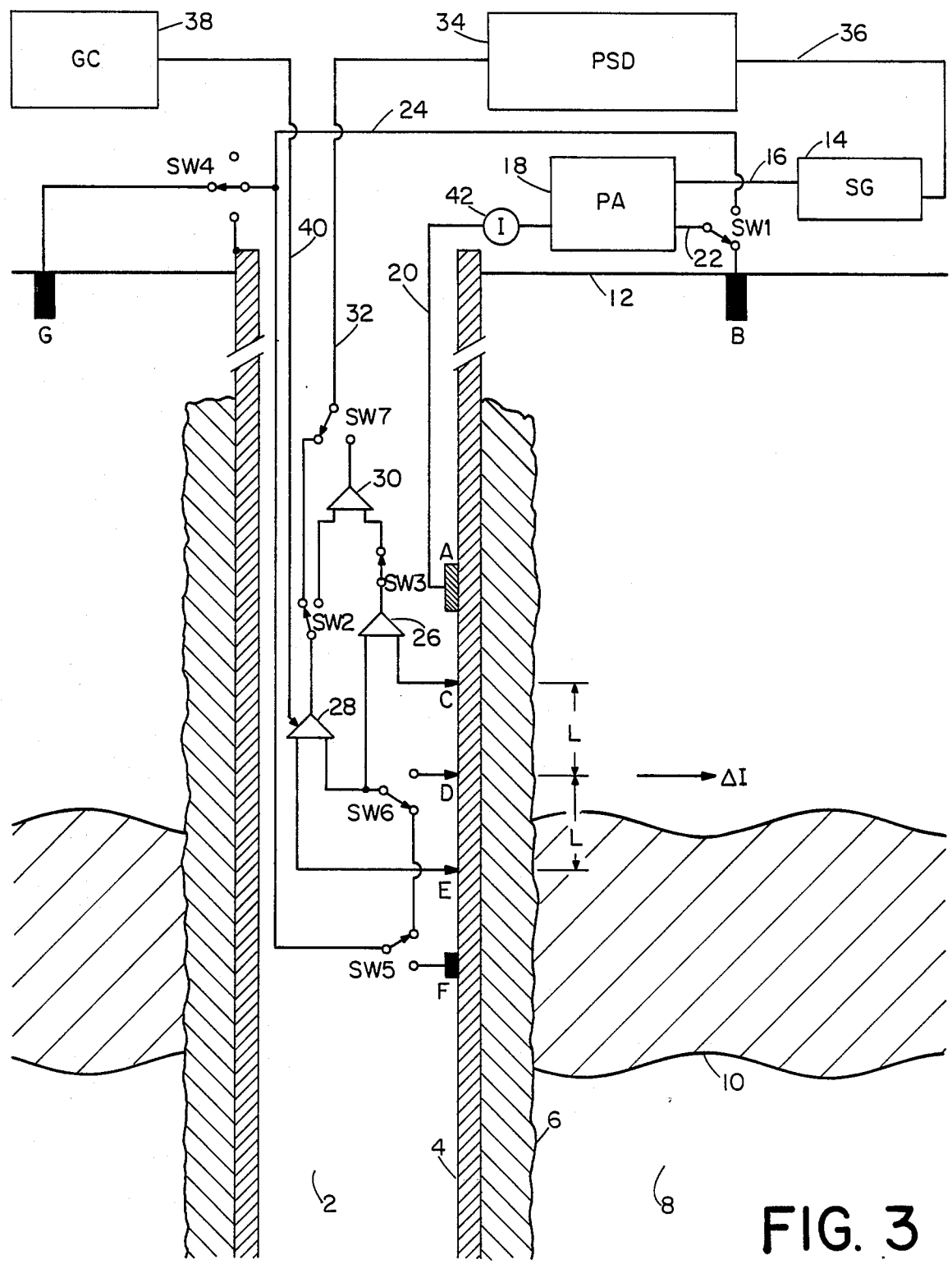
FIG. 3 is a sectional view of the preferred embodiment of the invention which shoes how $V_o$ is to be measured.

FIG. 3 shows a detailed method to measure the parameter $V_o$. Electrodes A, B, C, D, E, and F have been defined in FIG. 1. All of the numbered elements 2 through 40 have already been defined in FIG. 1. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

In addition, SW4 which is introduced in FIG. 3 allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.) In addition, element 42 is added in FIG. 3 which measures the total current I conducted to electrode A.

With switches SW2, SW5, SW6, and SW7 operated as shown in FIG. 3, then the quantity $V_o$ may be measured. For a given total current I conducted to electrode A, then the casing is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates $V_o$ provided the separation of electrodes C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and $V_o$ is measured appropriately with the phase sensitive detector 34. In many cases, SW4 may be instead connected to the top of the casing which will work provided electrode A is beyond a critical depth of perhaps several hundred meters from the surface.

For the purposes of precise written description of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

Furthermore, $V_o$ is called the local casing potential. Examples of an electronics difference means is the combination of amplifiers 26, 28, and 30. The differential current conducted into the formation to be measured is $\Delta I$, and the differential voltage to be measured is $V_3$. The measurement state of the apparatus is defined as that state of the apparatus wherein current is conducted from electrode A to electrode B. In the measurement state of the apparatus, electrode F is disconnected from the circuit. And the calibration state of the apparatus is defined as that state of the apparatus wherein current is conducted from electrode A to electrode F. In the calibration state of the apparatus, electrode B is disconnected from the circuit. It should probably be noted that the calibration state of the apparatus essentially provides a measurement of the resistance of the length of borehole casing adjacent to the formation to be measured which is not substantially affected by the surrounding geological formation.

There are many variations of the invention. One or more electrodes can be used to introduce current onto the casing similar to electrode A. One or more pairs of voltage sensing electrodes analogous to electrode pair C and D can be employed in the invention. And any sequence of differential circuits may be employed to logically perform the functions necessary to measure the current flowing into formation analogous to the current $\Delta I$ in FIG. 1. And any number of switches such as SW1 can be used which in one position causes current to flow along the borehole casing and in another causes current to flow into formation to an electrode on the surface of the earth.

In the discussion to this point, it has been assumed that the resistivity of the cement has a relatively small effect on the measurement. In fact the resistivity of the cement in the downhole environment is typically between 1 to 20 ohm-meters. It is perhaps 1 to 2 inches thick on the average. Therefore, the cement will not affect measurements of relatively resistive formations which have resistivities above 10 ohm-meters. However, the concrete may substantially affect the measurements of the resistivity of the formation if the formation resistivity is less than 10 ohm-meters. For the purposes of measuring the resistivity of geological formations, other data could be used such as sonic data to help determine the thickness of the cement and still other data used to estimate the resistivity of the cement to allow corrections to the formation resistivity measurements. It should also be obvious that the invention could be used to measure the resistivity of the cement in place provided that the cement is relatively resistive compared to the resistivity of the adjacent geological formation.

In addition, it should be evident that although polarization effects are unwanted complications in the measurements of formation resistivities, that such polarization effects can be used to determine other geophysical parameters such as the ionic character of the formation fluids and pertinent lithological information. Therefore, the measurement principles of the invention could be used to measure other parameters than just the resistivity of geological formations.

In the practice of the invention to measure the resistivity of geological formations, measurements of $V_3$ may be performed at different frequencies, typically 0.5 Hz, 1 Hz, 1 Hz, and 3 Hz. The in-phase coponents of the signal and the out-of-phase components of the signal in FIG. 1 can be measured with the phase sensitive detector as is standard practice with such devices. $V_3$ here is the magnitude of the differential voltage measured. (To be precise, $V_3$ is the square root of the sum of the squares of the in-phase component and the out-of-phase component measured by the phase sensitive detector. The resistivity $\rho$ computed from Equation 9 can be called the "apparent resistivity" to distinguish it from the "true resistivity of the formation". If the true resistivity of the geological formation is being primarily measured, then the apparent resistivity will not vary strongly with frequency. If the apparent resistivity is a strong function of the frequency, then polarization phenomena or skin depth phenomena are affecting the data, and corrections to the data would be necessary to determine the true resistivity of the geological formation. Polarization phenomena, other types of electrochemical phenomena, and skin depth phenomena would also affect the ratio of the in-phase of the out-of-phase signal magnitudes at different frequencies, which is another way of checking on the validity of the data.

While the above description contains many specificities, these should not be construed as limitations on the scope of the invention, but rather as exemplification of preferred embodiments thereto. As has been briefly described, there are many possible variations. Accordingly, the scope of the invention should be determined not only by the embodiments illustrated, but by the appended claims and their legal equivalents.

What is claimed is:

1. An apparatus for measuring the resistivity and changes in the resistivity of a geological formation adjacent to a borehole surrounded by a borehole casing, the apparatus comprising:

means for conducting alternating current from a first electrode in electrical contact with the interior of the borehole casing to a second electrode in electrical contact with the surface of the earth, whereby at least a portion of the alternating current is conducted from the first electrode through any cement which may be present around the borehole casing and through the geographical formation of interest to the second electrode; and means for simultaneously measuring the A.C. voltage differences between a plurality of discrete pairs of vertically disposed electrodes which are in electrical contact with the interior of the borehole casing adjacent to the geological formation of interest whereby said A.C. voltage measurements provide a measure of the electrical resistivity of the formation of interest.

2. A method of measuring the resistivity and changes in the resistivity of a geological formation adjacent to a borehole surrounded by a borehole casing comprising the steps of:

conducting an A.C. current from a first electrode in electrical contact with the interior of the borehole casing to a second electrode in electrical contact with the surface of the earth whereby at least a portion of the current is conducted from the first electrode through any cement which may be present around the borehole casing and through the geological formation of interest to the second electrode; and simultaneously measuring the A.C. voltage differences between a plurality of discrete pairs of vertically disposed electrodes which are in electrical contact with the interior of the borehole casing adjacent to the formation of interest whereby said A.C. voltage measurements provide a measure of the electrical resistivity of the formation of interest.

3. A method for measuring the resistivity of a geological formation adjacent to a borehole having a metallic borehole casing, the method comprising the steps of:

(a) conducting current from a first current conducting electrode in electrical contact with the interior of the borehole casing to a second current conducting electrode in electrical contact with the surface of the earth;

(b) measuring the total current conducted from said first current conducting electrode to the second current conducting electrode;

(c) measuring the differential current conducted into the adjacent geological formation from a finite, predetermined length of the borehole casing;

(d) measuring the local casing potential of the finite, predetermined length of the borehole casing adjacent to the geological formation to be measured;

(e) determining the outside diameter of the borehole casing;

wherein said method provides sufficient measurements and information to allow calculation of the resistivity of the geological formation adjacent to the finite, predetermined length of the borehole casing.

4. A method of measuring the resistivity of a particular geological formation of interest adjacent to a borehole having a metallic borehole casing, the method comprising the steps of:

(a) conducting current from a first current conducting electrode in electrical contact with the interior of the borehole casing to a second current conducting electrode in electrical contact with the surface of the earth while simultaneously measuring the total current conducted between said first and second electrodes;

(b) measuring the differential current conducted into the particular geological formation of interest from a finite, predetermined length of the borehole casing;

(c) measuring the average local potential voltage of the finite, predetermined length of the borehole casing;

(d) measuring the resistance of the predetermined length of the borehole casing;

(e) determining the outside diameter of the casing; wherein said method provides sufficient measurements and information to allow calculation of the resistivity of the particular geological formation of interest adjacent to the finite, predetermined length of the borehole casing.

5. An apparatus for measuring the resistivity of particular formations adjacent to a borehole extending from the earth's surface into remote geological formations, the borehole having a metallic casing, said apparatus comprising:

(a) a first electrode disposed within and engaged in electrical contact with the interior of said metallic casing at a depth from the surface of the earth;

(b) an earth contacting electrode in electrical contact with the surface of the earth remote from said borehole;

(c) a plurality of at least three voltage measuring electrodes vertically disposed within said metallic casing, said voltage measuring electrodes being in electrical contact with said metallic casing adjacent to a particular formation of interest;

(d) means for generating an alternating current;

(e) conducting means for selectively applying said alternating current to said first electrode in a manner requiring a majority of the current to pass through the earth to said earth contacting electrode, thereby causing at least a portion of the current to pass through the particular formation of interest; and (f) measuring means for simultaneously measuring the voltage differences between a plurality of discrete pairs of said voltage measuring electrodes and processing means for providing an output signal indicative of the electrical resistivity of the particular formation of interest based at least in part upon the simultaneous voltage differences detected by said measuring means.

6. An apparatus for measuring the resistivity of formations as recited in claim 5 wherein said measuring means includes a first and second differential amplifier, said differential amplifiers detecting the voltage differences between discrete pairs of said voltage measuring electrodes, and wherein said plurality of voltage measuring electrodes are vertically spaced apart within said borehole.

7. An apparatus for measuring the resistivity of formations as recited in claim 6 wherein said differential amplifiers measure the voltage differences between vertically adjacent voltage measuring electrode pairs.

8. An apparatus for measuring the resistivity of formations as recited in claim 7 wherein said processing means further includes a detector means for detecting relative voltage differentials between said discrete voltage resulting electrode pairs for supplying useful information about the resistivity of said formation of interest.

9. An apparatus for measuring the resistivity of formations as recited in claim 8 further comprising a calibration means to compensate for spurious effects on said simultaneous voltage measurements whereby said spurious effects include the effects caused by variable spacing of said vertically disposed voltage measuring electrodes and variable resistance within the metallic casing.

10. An apparatus for measuring the resistivity of formations as recited in claim 11 wherein said apparatus additionally has both a measurement mode and a calibration mode, said apparatus further comprising:

(a) means for alternatingly selecting said measurement mode or said calibration mode; and (b) calibration means for calibrating said measuring means.

11. An apparatus for measuring the resistivity of formations as recited in claim 10 wherein said calibration means includes a calibrating electrode disposed within said casing on a first vertical side of said voltage measuring electrodes and being in electrical contact with said metallic casing; and said first electrode is disposed vertically within said metallic casing on a second vertical side of said voltage measuring electrodes;

whereby when said apparatus is in said calibration mode, a majority of said alternating current passes from said first electrode through a section of the metallic casing to said calibrating electrode, and said detector means measures the relative voltage drops between said discrete pairs of voltage measuring electrodes for calibrating the apparatus.

12. An apparatus for measuring the resistivity of formations as recited in claim 11 further comprising:

a gain controller for proportionally adjusting the gain of said first differential amplifier for balancing the outputs of said first and second differential amplifiers for equality when said apparatus is in said calibration mode;

wherein said (measuring) processing means (further) includes a third differential amplifier for receiving and comparing the outputs of said first and second differential amplifiers; and whereby when said apparatus is in said measuring mode, the output of said third differential amplifier is indicative of the relative current leak from said casing between said discrete voltage measuring electrode pairs.

13. An apparatus for measuring the resistivity of formations as recited in claim 11 wherein the vertical spacing between said voltage measuring electrodes is in the range of 0.01 to 2 meters.

14. An apparatus for measuring the resistivity of formations as recited in claim 13 wherein the vertical spacing between said first electrode and the closest said voltage measuring electrode is in the range of 0.01 to 10 meters; and the vertical spacing between said calibrating electrode and the closest said voltage measuring electrode is in the range of 0.01 to 10 meters.

15. An apparatus for measuring the resistivity of formations as recited in claim 5 wherein the particular formation of interest is a particular geological formation.

16. An apparatus for measuring the resistivity of formations as recited in claim 5 wherein the particular formation of interest is a particular cement layer holding said borehole casing in place.

17. An apparatus for measurement of the resistivity of formations adjacent to a well bore that is surrounded by a metallic casing comprising:

a plurality of at least three vertically spaced apart voltage measuring electrodes disposed at substantially equal intervals within said well bore, each said voltage measuring electrode being in electrical contact with said metallic casing;

a first current conducting electrode disposed within and engaged in electrical contact with said metallic casing vertically on a first side of said voltage measuring electrodes;

a second current conducting electrode disposed within and engaged in electrical contact with said metallic casing vertically on a second side of said voltage measuring electrodes which is separated vertically from said first current conducting electrode by a minimum distance of separation;

means for generating an alternating current;

conducting means for conducting said alternating current from said first electrode to said second electrode and choosing the minimum distance of separation between said first and second electrodes to exceed 100 meters which therefore causes at least a portion of the current passing between said first and second current conducting electrodes to be conducted through the adjacent geological formations; and detecting means for simultaneously measuring the voltage difference between discrete pairs of said voltage measuring electrodes while said alternating current is being applied to said first electrode, said detecting means including a first and a second differential amplifier for detecting said voltage differences to provide information that is indicative of the voltage differences between discrete pairs of said voltage measuring electrodes and is responsive to the resistivity of formations adjacent to said metallic casing.

18. An apparatus for measurement of the resistivity of formations adjacent to a well bore that is surrounded by a conductive casing comprising:

a plurality of at least three vertically spaced apart voltage measuring electrodes disposed at substantially equal intervals within said well bore, each said voltage measuring electrode being in electrical contact with said casing and positioned adjacent to a formation of interest;

a first current conducting electrode disposed within and engaged in electrical contact with said casing vertically on a first side of said voltage measuring electrodes;

a second current conducting electrode disposed within and engaged in electrical contact with said casing vertically on a second side of said voltage measuring electrodes;

an earth contacting electrode in electrical contact with the surface of the earth;

means for generating an alternating current;

means for selectively applying said alternating current to said first electrode in a manner requiring at least a portion of the current to pass from said first electrode through said formation of interest to said earth contacting electrode;

conducting means for selectively applying said alternating current to said first electrode in a manner that requires a majority of the current to pass through the portion of the casing between said first and second current conducting electrodes; and detecting means for simultaneously measuring the voltage difference between discrete pairs of said voltage measuring electrodes while said alternating current is being applied to said first electrode, said detecting means including a first and a second differential amplifier for detecting said voltage differences to provide information that is indicative of the voltage differences between discrete pairs of said voltage measuring electrodes and is responsive to the resistivity of formations adjacent to said casing.

19. A method for measuring the resistivity of materials adjacent to a metallic borehole casing comprising the steps of:

causing a current to enter said casing at an entry point on said casing within said borehole in the proximity of the materials of interest;

selectively receiving at least a portion of said current at a point on the earth's surface remote from said borehole;

detecting the voltage level at a plurality of at least three vertically spaced apart points along the walls of said casing;

measuring the differential voltage between discrete pairs of said spaced apart points, for the purpose of measuring electrical properties of the materials adjacent the metallic borehole casing to infer the resistivity of the materials of interest.

20. A method as recited in claim 19 further comprising the step of:

calibrating the differential voltage measurements by selectively receiving (at least a portion) a majority of said current at a receiving point on said casing within said borehole that is disposed vertically farther from said current entry point than said voltage detecting points whereby said current entry point and said current receiving points are positioned on opposite sides of said voltage detecting points.

21. A method as recited in claim 20 comprising the steps of:

balancing said differential voltage measurement by proportionally altering a first said differential voltage from a first pair of spaced apart points to match a second said differential voltage from a second pair of spaced apart points during the calibration step; and measuring a third differential voltage comprising the voltage difference between the proportionately altered first voltage differential and the second voltage differential during said earth surface current receiving step.

22. A method for measuring the resistivity of a formation adjacent a borehole surrounded by a metallic casing using an apparatus having a first and a second current conducting electrode disposed within and engaged in electrical contact with said casing, a plurality of at least three voltage measuring electrodes vertically disposed at substantially equal vertically spaced apart intervals within said borehole between said current conducting electrodes, and an earth contacting electrode in electrical contact with the surface of the earth remote from said borehole, the apparatus having a calibrating state wherein said second current conducting electrode completes a current conducting circuit with said first electrode, and a measuring state wherein said earth contacting electrode completes a current conducting circuit with the first electrode during the measurement state, said method comprising the steps of:

causing a current to enter said casing at said first current conducting electrode;

(selecting either a measuring state or a calibrating state, wherein said second current contacting electrode completes a current conducting circuit with said first electrode during said calibrating state and wherein said earth contacting electrode completes a current conducting circuit with said first electrode during said measuring state;)

obtaining a first voltage output that reflects the voltage difference between a first discrete pair of said voltage measuring electrodes;

obtaining a second voltage output that reflects the voltage difference between a second discrete pair of said voltage measuring electrodes;

selecting a calibrating state and balancing said first and second voltage outputs by proportionally amplifying said first voltage output to equal said second voltage output; and selecting a measuring state and detecting a third voltage output that reflects the voltage difference between said first and second voltage outputs, said third voltage output being useful for inferring the resistivity of the formation of interest.

* * * * *

UNITED STATES PATENT AND TRADEMARK OFFICE
CERTIFICATE OF CORRECTION

PATENT NO.  : 4,820,989                                  Page 1 of 2
DATED       : April 11, 1989
INVENTOR(S) : William B. Vail, III It is certified that error appears in the above-identified patent and that said Letters Patent is hereby corrected as shown below:

Column 1, Line 64, delete "shoes" and insert --shows--.

Column 3, Line 63, delete "unit" and insert --unity--

Column 4, lines 7, 13 and 58, delete the alphabetical letter [p] and insert the greek character -- $\rho$ --.

Column 4, Equation 9, in the denominator:

delete [ $\Delta$ Ln (4L/d) ] and insert -- $\Delta$I Ln (4L/d) --.

Column 4, Equation 10, the expression "Eq. 10" should be moved to the right in the text so as to be in vertical alignment with the other similar nine expressions.

Column 7, line 22, delete [1 Hz, 1 Hz] and insert --1 Hz--

UNITED STATES PATENT AND TRADEMARK OFFICE
CERTIFICATE OF CORRECTION

PATENT NO. : 4,820,989

DATED : April 11, 1989

INVENTOR(S) : William B. Vail, III

It is certified that error appears in the above-identified patent and that said Letters Patent is hereby corrected as shown below:

Column 7, line 29, after 'detector." insert -- ) --.

Signed and Sealed this

Twentieth Day of February, 1990

*Attest:*

JEFFREY M. SAMUELS

*Attesting Officer*   *Acting Commissioner of Patents and Trademarks*